(12) United States Patent
Ishiguchi

(10) Patent No.: US 7,684,678 B2
(45) Date of Patent: Mar. 23, 2010

(54) DISC REPRODUCING APPARATUS HAVING SCREEN DISPLAY CONTROL UNIT

(75) Inventor: Fusao Ishiguchi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1758 days.

(21) Appl. No.: 10/813,361

(22) Filed: Mar. 30, 2004

(65) Prior Publication Data

US 2004/0190862 A1 Sep. 30, 2004

(30) Foreign Application Priority Data

Mar. 31, 2003 (JP) ............................. 2003-093760

(51) Int. Cl.
*H04N 5/91* (2006.01)
(52) U.S. Cl. ......................................... 386/96; 386/125
(58) Field of Classification Search ................... 386/46, 386/95, 96, 104, 112, 125, 126; 725/41; 434/323
See application file for complete search history.

(56) References Cited

U.S. PATENT DOCUMENTS

| 5,430,553 | A | 7/1995 | Misono et al. | |
| 5,833,470 | A * | 11/1998 | Harrison et al. | 434/323 |
| 6,966,064 | B1 * | 11/2005 | Schneidewend et al. | 725/41 |

FOREIGN PATENT DOCUMENTS

| JP | 4-141857 | 5/1992 |
| JP | 3017642 | 10/1995 |
| JP | 8-79637 | 3/1996 |
| JP | 2001-176249 | 6/2001 |
| JP | 2001-266489 | 9/2001 |
| JP | 2002-271715 | 9/2002 |

OTHER PUBLICATIONS

Notice of Ground of Rejection issued for Japanese Patent Application No. 2003-093760 mailed on Apr. 12, 2005, 2 pages.
Patent Abstracts of Japan, Publication No. 2001-176249, Publication Date: Jun. 29, 2001, 1 page.
Partial Translation of Japanese Utility Model Registration No. 3017642, Date of Registration: Aug. 16, 1995, 2 pages.
Patent Abstracts of Japan; Publication No. 08-079637 dated Mar. 22, 1996 (1 pg.).
Patent Abstracts of Japan; Publication No. 2002-271715 dated Sep. 20, 2002 (1 pg.).
Patent Abstracts of Japan; Publication No. 2001-266489 dated Sep. 28, 2001 (1 pg.).

* cited by examiner

*Primary Examiner*—Huy T Nguyen
(74) *Attorney, Agent, or Firm*—Osha • Liang LLP

(57) ABSTRACT

A disc reproducing apparatus connected to a monitor of an image output system controls image display on the monitor. According to information about an instruction given by a user through operation of a remote controller or a front panel key, an MPU sets one of a screen display mode and a screen blanking mode. If the screen display mode is set while audio information is reproduced, a control unit permits a video driver to output a display signal to the monitor. If the screen blanking mode is set while audio information is reproduced, the control unit outputs a inhibit signal to the video driver so as to inhibit output of the display signal to the monitor. When a CD is played, a display image on the monitor is thus erased by output of the inhibit signal as requested according to an externally provided instruction.

11 Claims, 6 Drawing Sheets

DISC REPRODUCING APPARATUS HAVING SCREEN DISPLAY CONTROL UNIT

BACKGROUND OF THE INVENTION

1. Field of the Invention

The present invention relates to a disc reproducing apparatus having a screen display control unit. In particular, the present invention relates to a disc reproducing apparatus that reproduces information from such a disc recording medium as DVD (Digital Versatile Disc) to display the reproduced information on a screen and that has a screen display control unit controlling the display screen while reproduction is done of a disc recording medium on which only audio signals are recorded.

2. Description of the Background Art

When a conventional DVD player reproduces audio information recorded on a CD (Compact Disc) or audio information recorded on a CD according to MP3 (MPEG (Motion Picture Expert Group)-1 Audio Layer 3) or WMA (Windows (R) Media Audio), for example, a certain image like a blue background image or an opening image is regularly displayed on a monitor. According to Japanese Patent Laying-Open No. 8-79637, for example, a television set into which incorporated a device capable of playing multiple types of CDs, changes the background pattern of its display screen in such a manner that different background patterns are displayed for respective types of CDs. It has thus been desired to omit to display such a useless background image while a disc with only audio signals recorded thereon is played.

Then, Japanese Patent Laying-Open No. 2002-271715 for example provides a capability of stopping supply of electric power to a video signal processing unit while a disc with only audio signals recorded thereon is being played. Further, Japanese Patent Laying-Open No. 2001-266489 proposes an apparatus which functions as a DVD audio player with video output capability when a TV (television) monitor is connected thereto and also functions as a DVD audio-only player when the TV monitor is not connected thereto.

For the above-described conventional apparatus, switching of the function between the DVD audio player with video output capability and the DVD audio-only player is made according to the state of connected equipment or the type of reproduction signals. Thus, it has been impossible to reflect user's intention in the switching of the function.

SUMMARY OF THE INVENTION

An object of the present invention is to provide a disc reproducing apparatus having a screen display control unit that erases a display image as desired.

In order to achieve the above-described object, a disc reproducing apparatus according to an aspect of the present invention has a screen display control unit controlling display of a prepared screen, and the screen display control unit includes a mode setting unit for setting, in accordance with externally provided instruction information, one of a screen display mode and a screen blanking mode, and a control unit for permitting output of a display signal to the screen when the screen display mode is set by the mode setting unit and inhibiting output of the display signal to the screen when the screen blanking mode is set by the mode setting unit, in a case where audio information is reproduced from the disc.

Thus, in a case where audio information is reproduced from the disc, if the screen display mode is set in accordance with externally provided instruction information, an image is displayed on the screen and, if the screen blanking mode is set in accordance therewith, the image on the screen is erased. In this way, while audio information is being reproduced from the disc, the displayed image can be erased upon request made by the externally provided instruction information.

Preferably, the disc reproducing apparatus further has a key input unit that is externally operated. The screen display control unit further includes a key determination unit for determining, when the screen blanking mode is set and the key input unit is externally operated, type of an operated key of the key input unit, and a key information display unit for displaying on the screen information according to the type of the key determined by the key determination unit.

While the display image is erased in the screen blanking mode, a key may externally be operated to display an image on the screen according to information derived from the type of the operated key.

Preferably, reproduction of the audio information is discontinued according to the determined type of the key. Reproduction of the audio information can thus be discontinued if a key is externally operated to discontinue reproduction of audio information.

Preferably, the discontinued reproduction of the audio information is resumed. Then, reproduction of the audio information that is temporarily discontinued can thereafter be resumed.

Preferably, the instruction information is output in response to operation of a predetermined key of the key input unit. Thus, a predetermined key of the key input unit can externally be operated to provide the instruction information.

Preferably, the disc reproducing apparatus further has a display unit for displaying a data item operated for designating one of the screen display mode and the screen blanking mode. The displayed data item can thus be used to designate one of the screen display mode and the screen blanking mode and thereby provide the instruction information.

Preferably, the disc includes a disc having only audio information to be reproduced and a disc having audio information and image information to be reproduced. A display image can be erased as desired when a disc having only audio information to be reproduced is played by a disc reproducing apparatus which is capable of playing any disc having audio information and image information. Accordingly, burn-in and dazzling of the screen can be prevented that could occur when any image according to image information reproduced from the disc is not displayed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described in detail with reference to the drawings.

Figure 1:
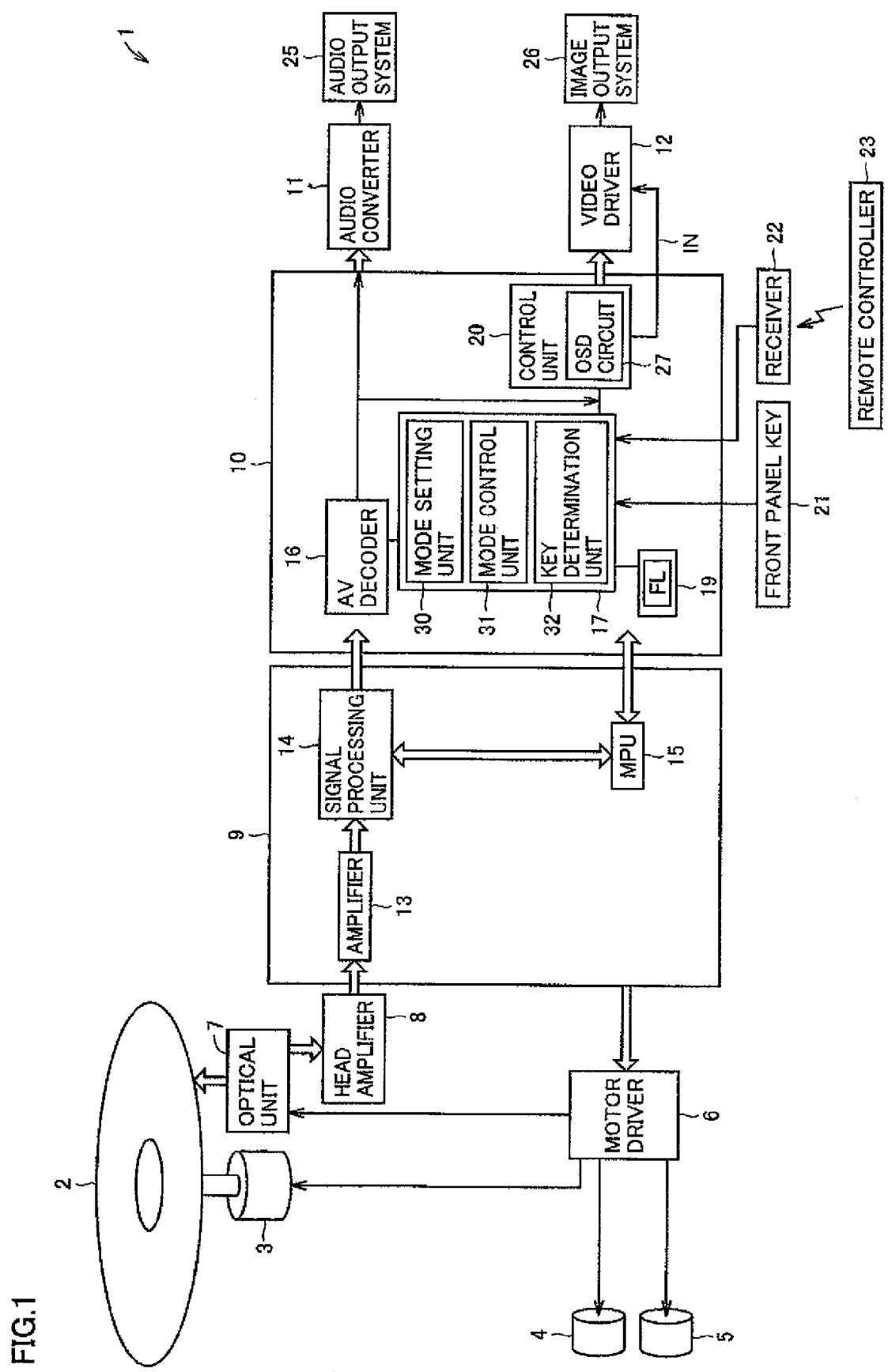
FIG. 1 shows a configuration of a DVD reproducing apparatus according to an embodiment of the present invention.

FIG. 1 is a block diagram showing a configuration of a DVD reproducing apparatus according to the embodiment of the present invention. Referring to FIG. 1, DVD reproducing apparatus 1 includes motors 3-5 of various types for driving a disc 2 to reproduce information from disc 2, a motor driver 6 controlling these motors, an optical unit 7 including a reproducing head for example for scanning disc 2 and reading information (audio information or image information) to output the read information as signals, a head amplifier 8 amplifying signals read by optical unit 7, a front end 9 controlling motor driver 6 and digitally processing signals that are output from head amplifier 8, a back end 10 decoding signals that are output from front end 9, an audio converter 11 receiving an audio signal decoded by and output from back end 10 and converting the audio signal into an analog signal for driving an audio output system 25, speaker for example, to output the analog signal, a video driver 12 receiving a video signal of image information that is decoded by and output from back end 10 and converting the video signal into a signal for displaying an image on such a monitor as a CRT (Cathode Ray Tube) display or LCD (Liquid Crystal Display) of an image output system 26 to output the converted signal, a front panel key 21 operated for externally providing information to DVD reproducing apparatus 1, a receiver 22, and a remote controller 23.

Disc 2 includes discs of such types as a CD with only audio information reproduced therefrom (recorded thereon) and a DVD with audio information and image information reproduced therefrom (recorded thereon).

Remote controller 23, upon operated by a user, transmits an instruction signal in the form of an infrared signal according to operational details given by the user and then receiver 22 receives the transmitted signal. Receiver 22 converts the received signal into a signal of a format which can be processed by back end 10.

Front end 9 includes an amplifier 13 amplifying and outputting signals that are output from head amplifier 8, a signal processing unit 14 receiving signals that are output from amplifier 13 to perform predetermined digital-signal processing and error-correction processing on the signals, and an MPU (Micro Processing Unit) 15 controlling signal processing unit 14.

Back end 10 includes an AV (Audio Visual) decoder 16 receiving signals processed by signal processing unit 14 and decoding the signals to output the decoded signals, an MPU 17, a RAM (Random Access Memory) 19 for recording a program and data for example for some processing relevant to MPU 17, and a control unit 20 controlling output of signals to video driver 12. Control unit 20 includes an OSD (On Screen Display) circuit 27 for outputting an image according to digital information on a screen of image output system 26. OSD circuit 27 also functions as a key information display unit for displaying on image output system 26 digital information according to the type of an operated key. MPU 17 includes a mode setting unit 30 for effecting a transition to a screen display mode or a screen blanking mode according to a provided instruction, a mode control unit 31 permitting or inhibiting output of an image display signal to image output system 26 according to the set (transition-effected) mode, and a key determination unit 32 determining the type of an operated key. Respective functions of these units are prepared in the form of a program.

In operation, if disc 2 is a DVD, signals read from the DVD by optical unit 7 are digitally processed via head amplifier 8 by front end 9 and then output to back end 10 which decodes audio and image signals included in the input digital signals by AV decoder 16 through a predetermined procedure. The decoded audio signal is converted by audio converter 11 to be output in the form of audio from audio output system 25 like a speaker while the decoded image signal is output through control unit 20 by video driver 12 in the form of an image on image output system 26 like a monitor.

If disc 2 is a CD, audio signals read from the CD by optical unit 7 are amplified by head amplifier 8, then digitally processed by front end 9, decoded by back end 10 and output from audio output system 25 like a speaker via audio converter 11.

Here, the signals read from the CD include no image signal. When MPU 17 of back end 10 determines to erase a display image in accordance with an externally provided instruction signal, MPU 17 instructs control unit 20 to output a inhibit signal MT. The inhibit signal MT output from control unit 20 is provided to video driver 12 to cause video driver 12 to inhibit output of a signal for image display to a monitor (e.g. CRT or LCD) of image output system 26. Video driver 12 thus outputs no signal for image display to the monitor in the period in which the inhibit signal MT is provided. Then, during this period, the display image on the monitor is erased (no image is displayed). On the other hand, in a period in which no inhibit signal MT is provided, a signal for image display is provided to the monitor (signal output is permitted) so that an image is displayed on the monitor.

Figure 2:
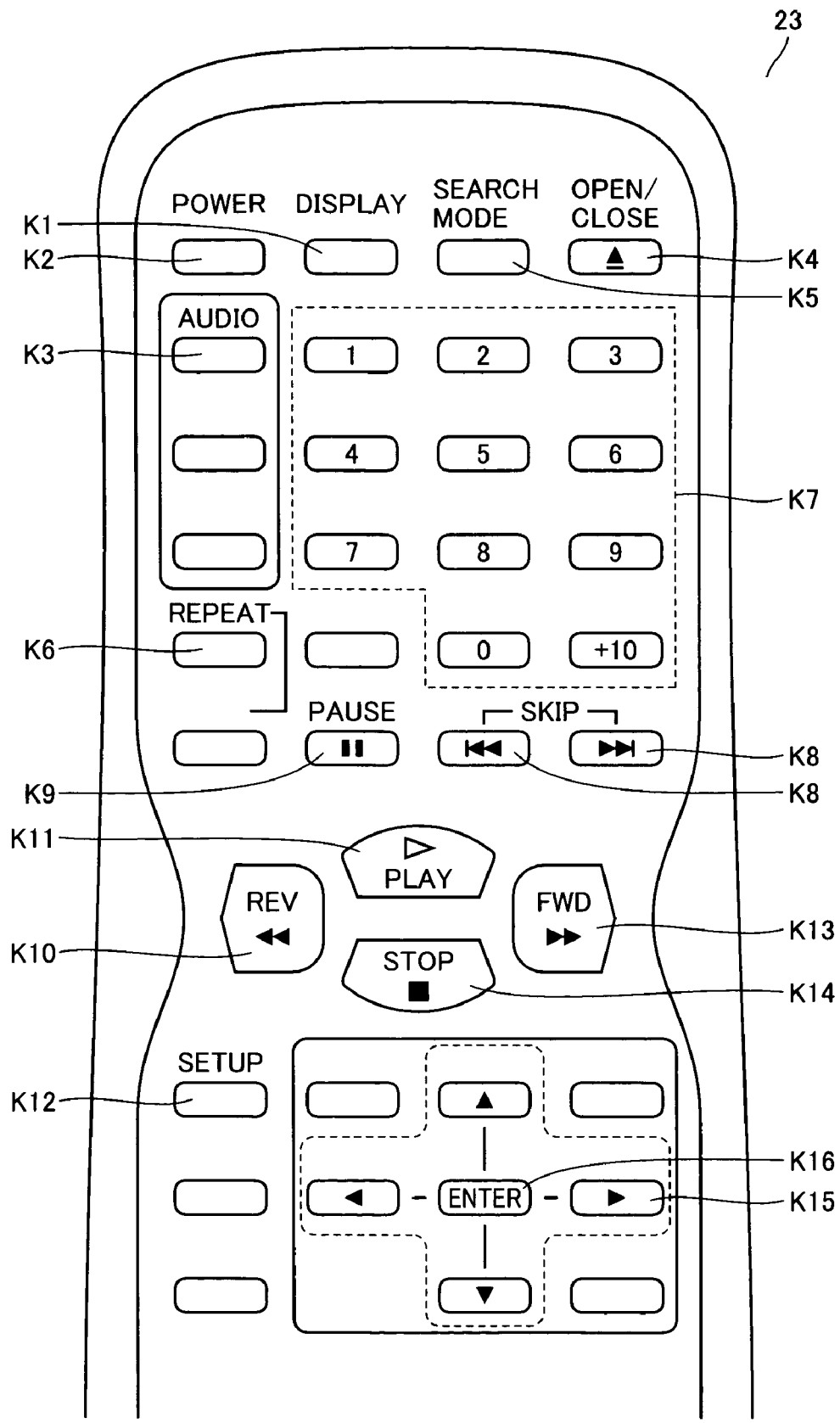
FIG. 2 shows an exemplary key arrangement of a remote controller according to the embodiment of the present invention.

FIG. 2 shows an exemplary key arrangement of remote controller 23. As shown in FIG. 2, remote controller 23 has keys K1-K16 that can be operated by a user. Key K1 is a display key for making a switch between the screen display mode for displaying an image on the monitor and the screen blanking mode for erasing the display image on the monitor (no image is displayed). Key K2 is operated for turning on/off the electric power supply of DVD reproducing apparatus 1. Key K3 is operated for selecting a language of the audio output, switching the sound mode (cinema mode, news mode for example) and adjusting the audio volume. Key K4 is operated for opening/closing a tray portion for disc 2. Key K5 is operated for selecting a search mode (mode for searching for a predetermined point on disc 2). Key K5 is also operated for positioning the head at a desired point of disc 2. Key K6 is operated for repeatedly reproducing chapters, tracks and a title for example. Key K7 is a ten-key for designating a channel to be received in such a case where remote controller 23 is also used as a remote controller of a TV receiving set. Two keys K8 are operated for skipping a chapter or track. Key K9 is operated for temporarily stopping (pausing) the reproduction. Key K10 is operated for giving a fast reverse instruction. Key K11 is operated for giving an instruction to start reproduction of disc 2. Key K12 is operated for displaying a setup menu. Key K13 is operated for fast forwarding of disc 2. Key K14 is operated for stopping the reproduction. Keys K15 include keys with upward, downward, rightward and leftward arrows indicated thereon that are operated for longitudinally and laterally moving a cursor (not shown) on the monitor screen. Key K16 is operated for instructing DVD reproducing apparatus 1 to effect a data item indicated by the cursor moved by the operation of keys K15.

Figure 3:
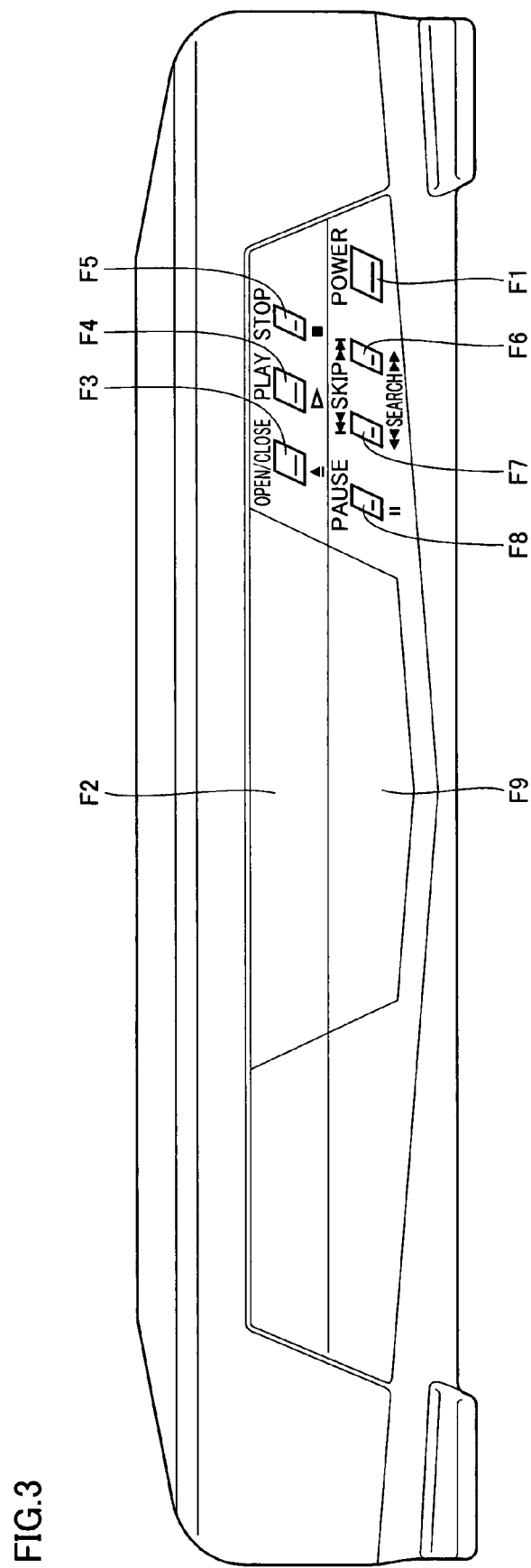
FIG. 3 shows an exemplary front panel of the DVD reproducing apparatus according to the embodiment of the present invention.

Referring to FIG. 3, DVD reproducing apparatus 1 has, on its front panel, a switch F1 operated for turning on/off the power supply of DVD reproducing apparatus 1, a disc tray F2, a switch F3 operated for opening or closing disc tray F2, a switch F4 operated for instructing that reproduction of disc 2 should be started or resumed, a switch F5 operated for stopping the reproduction, switches F6 and F7 operated for skip and search, a switch F8 operated for pausing the reproduction, and a display portion F9 for displaying operational details. Switch F1 and F3-F8 are operated by a user.

Figure 4:
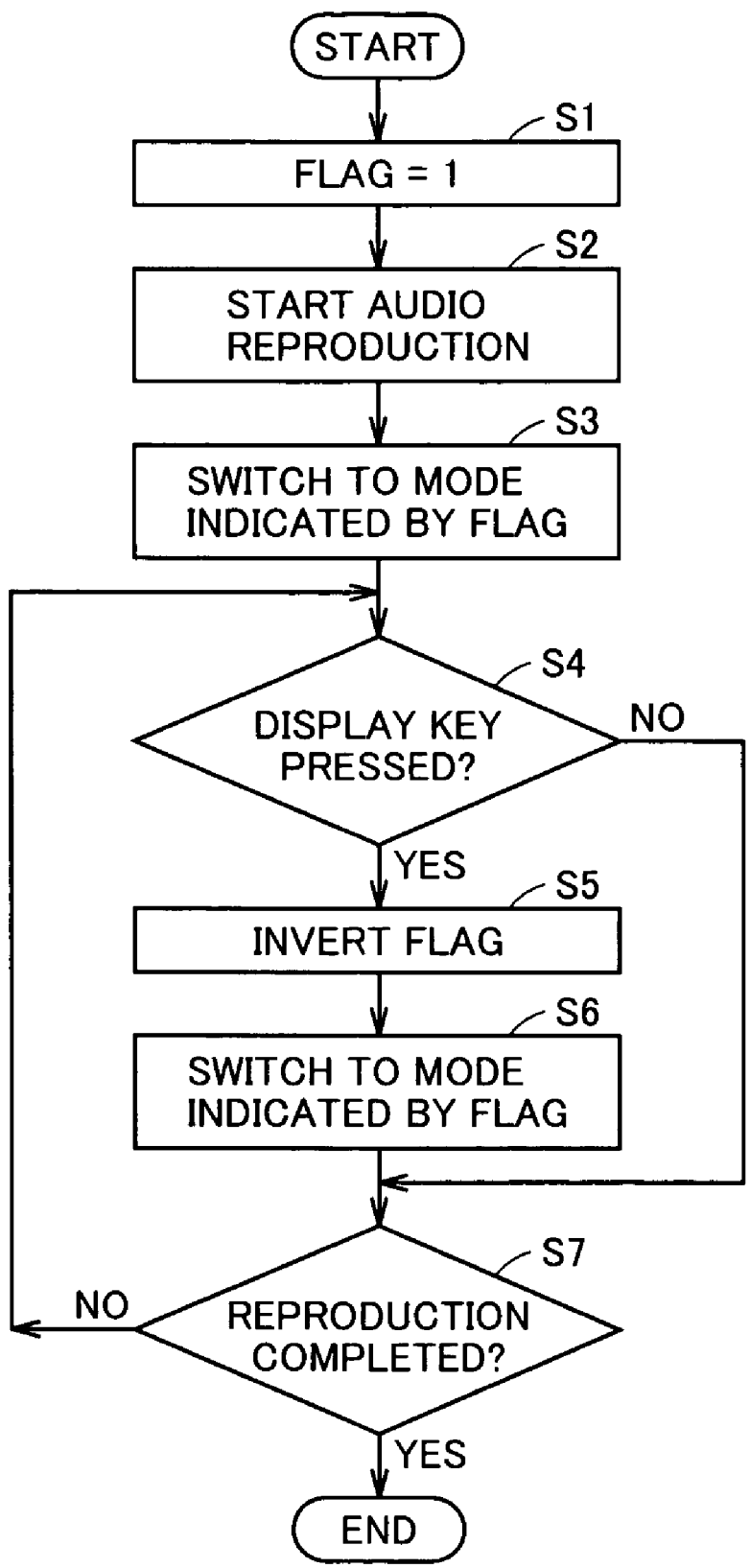
FIG. 4 shows an exemplary flowchart concerning a procedure of switching to a screen erasure/display mode according to the embodiment of the present invention.

Following the flowchart shown in FIG. 4, a description is given of a procedure for making a switch between the screen display mode and the screen blanking mode according to a key operation of remote controller 23 by a user.

It is supposed here that RAM 19 stores a flag FL for controlling the switching of the mode and this flag FL is set to "1" in advance (step (hereinafter abbreviated as S) 1).

Then, reading of information from disc 2 is started, an audio signal is input to AV decoder 10 and accordingly reproduction of the audio signal is started (S2). According to flag FL, mode setting unit 30 of MPU 17 makes a transition to one of the screen display mode and the screen blanking mode (S3). Flag FL is now set to "1" so that the mode is switched to the screen blanking mode. Thus, under control by mode control unit 31 of MPU 17, control unit 20 outputs the inhibit signal MT to stop signal output from video driver 12 to image output system 26.

After this, key determination unit 32 of MPU 17 determines whether an instruction signal provided through a key operation of remote controller 23 via receiver 22 is a signal according to an instruction provided by operation of key K1 or not (S4). If the instruction signal is not provided through the operation of key K1, this procedure proceeds to an operation in S7 described hereinlater.

If MPU 17 determines that the instruction signal is given by operation of key K1, namely determines that the instruction signal is a mode switch instruction between the screen display mode and the screen blanking mode, MPU 17 inverts the value of flag FL. Specifically, if the flag value is "1", it is inverted to "0" and, if the flag value is "0", it is inverted to "1" (S5).

Mode setting unit 30 of MPU 17 then makes a switch to one of the screen display mode and the screen blanking mode according to the value of flag FL (S6). Specifically, if the flag value is "1", the switch is made to the screen blanking mode and, if the flag value is "0", the switch is made to the screen display mode. If the switch is made to the screen display mode, mode control unit 31 controls control unit 20 in such a manner that control unit 20 does not output the inhibit signal MT. Accordingly, an image is displayed by video driver 12. In the screen display mode, if disc 2 is a DVD, an image is displayed according to an image signal read from the DVD. On the other hand, if disc 2 is any medium like CD from which no image signal can be read, such a regular image as an opening image (image for advertising the product name or the name of the manufacturer of DVD reproducing apparatus 1) or a predetermined background image. Digital information for displaying the above-described images is stored in advance in RAM 19, read by MPU 17 and provided to OSD circuit 27. OSD circuit 27 generates an image of the digital information to display it on image output system 26 via video driver 12.

Then, MPU 17 determines whether the reproduction is completed or not. If it determines that the reproduction is completed, the series of operations is ended. If not, the procedure returns to the operation in S4 and the subsequent operations are similarly repeated.

A user thus operates key K1 of remote controller 23 as desired, so that switching is done alternately between the screen display mode and the screen blanking mode each time the user operates the key.

Although it is supposed here that reproduction is started with flag FL set to the value of "1", the reproduction may be started with flag FL set to the value of "0". The mode set by the operation of key K1 is cancelled when DVD reproducing apparatus 1 is powered off.

Figure 5:
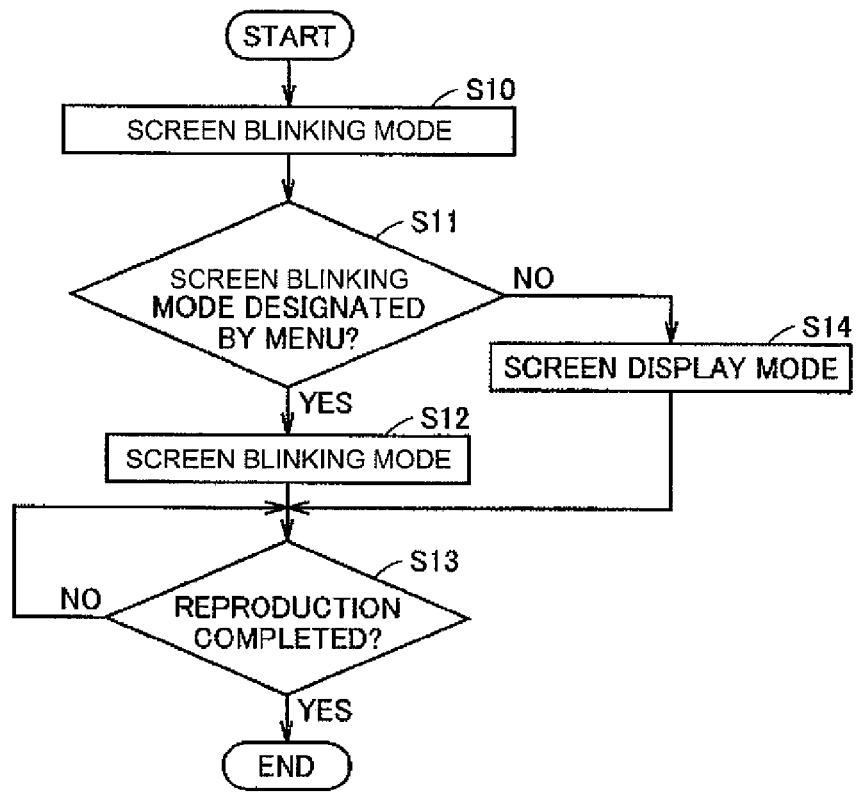
FIG. 5 shows another exemplary flowchart concerning a procedure of switching to the screen erasure/display mode according to the embodiment of the present invention.

In accordance with the procedure shown in FIG. 5, switching between the screen display mode and the screen blanking mode may be effected by means of a setup menu screen. For example, prior to reproduction of disc 2, a user operates key K12 of remote controller 23 so that an instruction signal issued by this key operation is provided via receiver 22 to MPU 17. Based on the instruction signal, MPU 17 provides digital information for the setup menu stored in advance to OSD circuit 27 of control unit 20. According to the digital information, OSD circuit 27 generates information for the setup menu to display the menu on the monitor. An exemplary display of the setup menu is shown in FIG. 6.

Figure 6:
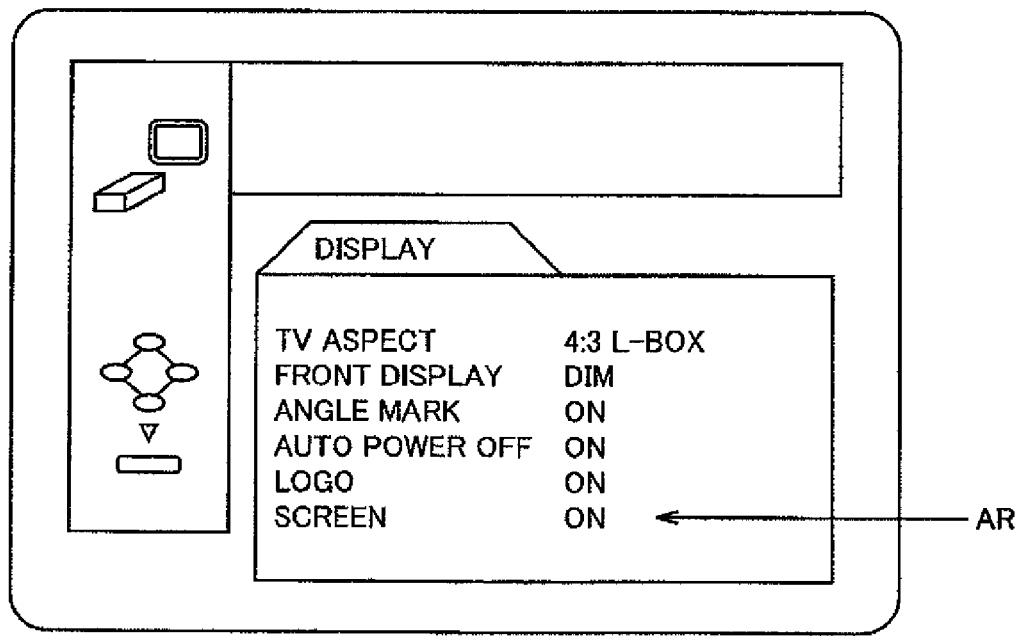
FIG. 6 shows an exemplary display screen of a setup menu according to the embodiment of the present invention.

Referring to FIG. 6, a user can operate keys K15 to move a cursor (not shown) to a data item "SCREEN" indicated by the arrow AR to switch the mode alternately between "ON" and "OFF" each time the user operates key K16. The screen display mode can be set by designating "ON" and the screen blanking mode can be set by designating "OFF". The information as to whether the mode is the screen display mode or the screen blanking mode, which is set by means of the setup menu on the screen, is stored in an internal memory having its contents never erased even when DVD reproducing apparatus 1 is powered off, for example, a partial memory region of RAM 19.

After this, MPU 17 determines that the audio reproduction is started by AV decoder 16 (S10). It is then determined, based on information stored in the internal memory, whether the screen blanking mode is set in advance with the setup menu (S11). If it is determined that the screen blanking mode is set (YES in S11), mode control unit 31 instructs control unit 20 to output the inhibit signal MT to video driver 12. Accordingly, video driver 12 erases any image displayed on the monitor (S12). MPU 17 then determines whether the reproduction is completed or not (S13) to end the series of operations if the reproduction is completed.

If it is determined that the screen display mode is set in advance with the setup menu (NO in S11), a switch is made to the screen display mode so that an image is displayed (S14). MPU 17 thereafter proceeds to the operation in S13.

Figure 7:
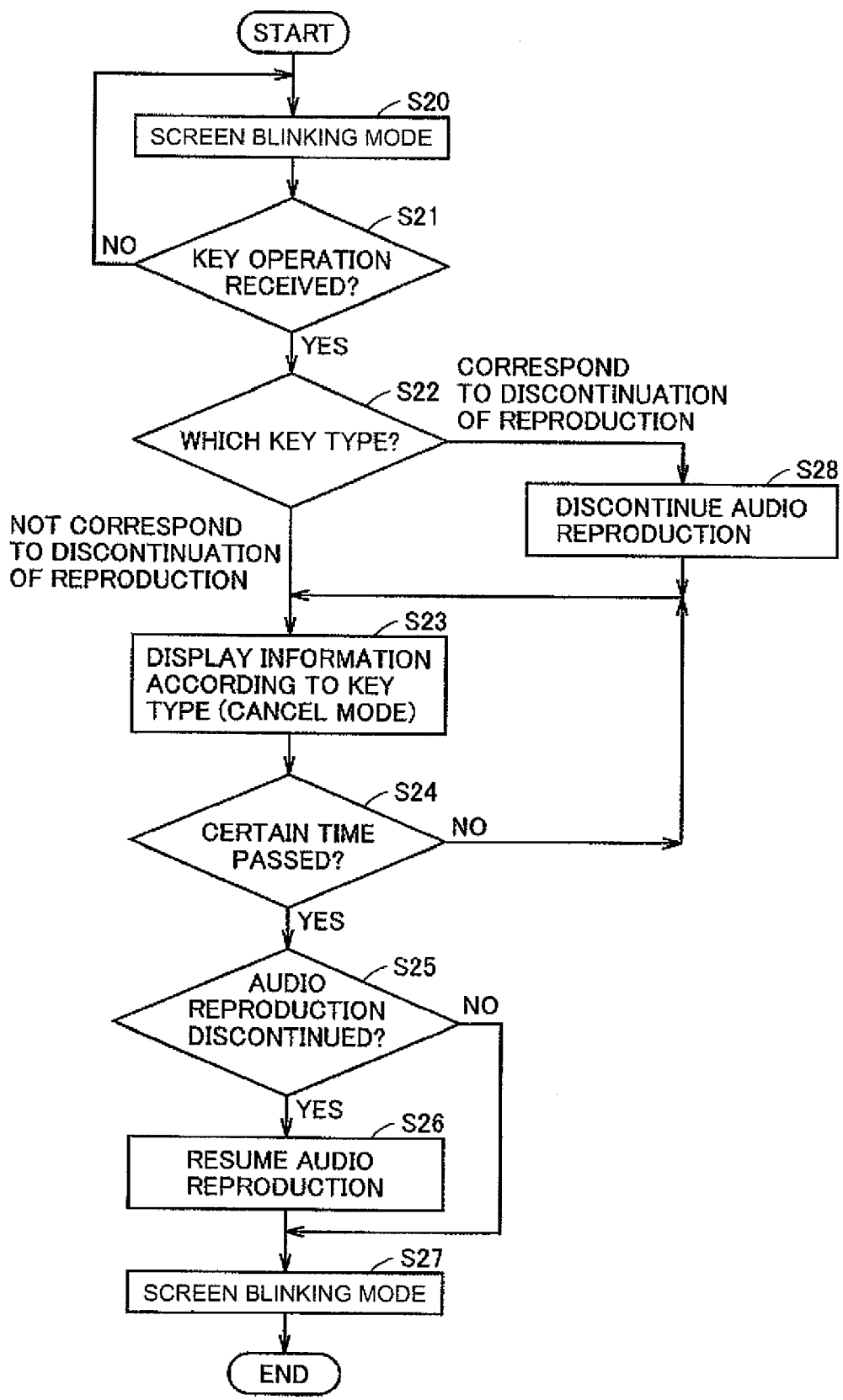
FIG. 7 shows still another exemplary flowchart concerning a procedure of switching to the screen erasure/display mode according to the embodiment of the present invention.

When the audio reproduction is being done while the screen blanking mode is set as described above, a user may operate any key of front panel key 21 or remote controller 23 so as to display an image as instructed by the key operation. This procedure is described according to the flow chart in FIG. 7.

In the screen blanking mode while information is read from disc 2 for audio reproduction (S20), MPU 17 determines whether a key operation of front panel key 21 or remote controller 23 is done (S21). If no key operation is done, respective operations in S20 and S21 are repeated. If it is determined that any key operation is done (YES in S21), key determination unit 32 determines the type of the operated key (S22).

If it is determined that the key is of the type for discontinuing the audio reproduction, for example, if key K7 is operated to switch the TV channel (corresponding to discontinuation of the reproduction in S22), MPU 17 instructs MPU 15 to pause the audio reproduction (S28). The procedure thereafter proceeds to the operation in S23. MPU 15 receiving the instruction to pause the audio reproduction controls motor driver 6 and optical unit 7 so that the reproduction of information from disc 2 is temporarily stopped.

If key determination unit 32 determines that the operated key is of the type irrelevant to the discontinuation of the audio reproduction, for example, if the user operates key K3 to adjust the sound volume, MPU 17 determines that an operation to be done is not discontinuation of the reproduction and accordingly the procedure proceeds to the operation in S23.

In S23, the screen blanking mode is temporarily cancelled. Information is then displayed, according to the information about the type of the operated key, via OSD circuit 27 on the monitor screen (S23). For example, the level of the sound output volume or the selected TV channel is displayed.

When a certain time has passed since the image of the information is displayed according to the type of the operated key (YES in S24), if the audio reproduction is discontinued (YES in S25), the audio reproduction is resumed (S26) and the mode is again set to the screen blanking mode (S27).

Although it is herein described that it is the audio reproduction that is temporarily discontinued (paused) for displaying an image concerning information instructed by the key operation, both of the audio reproduction and image reproduction may temporality be discontinued if a DVD for example is played for audio and image reproduction.

As heretofore described, according to the present invention, any image displayed on the monitor is erased as desired by a user when only audio signals of CD, MP3 or WMA for example are reproduced by DVD reproducing apparatus 1. Burn-in of the monitor screen can thus be prevented and thereby the reliability is improved, and dazzling in a dark room is eliminated and thereby convenience in use is improved for users.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc reproducing apparatus comprising:
   a screen display control unit controlling display of a prepared screen; and
   a key input unit configured to be externally operated,
   wherein said screen display control unit comprises:
      mode setting means for setting, in accordance with externally provided instruction information, one of a screen display mode and a screen blanking mode;
      control means for permitting output of a display signal to said prepared screen when said screen display mode is set by said mode setting means and inhibiting output of the display signal to said screen when said screen blanking mode is set by said mode setting means, wherein said permitting and said inhibiting are in a case where audio information is reproduced from a disc;
      key determination means for determining, when said screen blanking mode is set and said key input unit is externally operated, a type of an operated key of said key input unit; and
      key information display means for displaying on said screen information according to the type of the operated key determined by said key determination means.

2. The disc reproducing apparatus according to claim 1, wherein reproduction of said audio information is discontinued according to the type of the key determined by said key determination means.

3. The disc reproducing apparatus according to claim 2, wherein the discontinued reproduction of said audio information is resumed.

4. The disc reproducing apparatus according to claim 3, wherein said instruction information is output in response to operation of a predetermined key of said key input unit.

5. The disc reproducing apparatus according to claim 4, wherein said disc is a disc having only said audio information to be reproduced or a disc having said audio information and image information to be reproduced.

6. The disc reproducing apparatus according to claim 3, further comprising means for displaying a data item operated for indicating one of said screen display mode and said screen blanking mode.

7. The disc reproducing apparatus according to claim 6, wherein said disc is a disc having only said audio information to be reproduced or a disc having said audio information and image information to be reproduced.

8. The disc reproducing apparatus according to claim 1, further having a key input unit that is externally operated, wherein said instruction information is output in response to operation of a predetermined key of said key input unit.

9. The disc reproducing apparatus according to claim 1, further comprising-means for displaying a data item operated for indicating one of said screen display mode and said screen blanking mode.

10. The disc reproducing apparatus according to claim 1, wherein said disc is a disc having only said audio information to be reproduced or a disc having said audio information and image information to be reproduced.

11. A method of controlling display of a prepared screen during reproduction of a disc, the method comprising:
   setting one of a screen display mode and a screen blanking mode in accordance with externally provided instruction information;
   permitting output of a display signal to said prepared screen when said screen display mode is set in said mode-setting step;
   inhibiting output of the display signal to said screen when said screen blanking mode is set in said mode-setting step;
   determining, when said screen blanking mode is set and a key input unit is externally operated a type of an operated key of said key input unit; and
   displaying on said screen information according to the type of the operated key determined by said key determination means,
   wherein said permitting and said inhibiting are in a case where audio information is reproduced from said disc.

* * * * *